United States Patent [19]
Grigat et al.

[11] Patent Number: 5,827,905
[45] Date of Patent: Oct. 27, 1998

[54] BIODEGRADABLE PLASTICS FILLED WITH REINFORCING MATERIALS

[75] Inventors: Ernst Grigat, Leverkusen; Hanns Peter Müller, Odenthal; Wolfgang Schulz-Schlitte, Langenfeld; Aziz El Sayed; Ralf Timmermann, both of Leverkusen, all of Germany

[73] Assignee: Bayer Aktiengesellschaft, Germany

[21] Appl. No.: 718,123

[22] Filed: Sep. 18, 1996

[30]  Foreign Application Priority Data

| Sep. 26, 1995 | [DE] | Germany | 195 35 715.9 |
| Nov. 15, 1995 | [DE] | Germany | 195 42 498.0 |
| Dec. 20, 1995 | [DE] | Germany | 195 47 636.0 |
| Jan. 22, 1996 | [DE] | Germany | 196 01 912.5 |

[51] Int. Cl.$^6$ .............. C08K 3/26; C08K 3/34; C08L 1/02; C08L 77/12
[52] U.S. Cl. .......... 523/124; 523/128; 524/423; 524/425; 524/445; 524/447; 524/456; 524/35; 524/14
[58] Field of Search .............. 524/423, 425, 524/445, 447, 456, 35, 14; 523/124, 125, 128

[56]   References Cited

U.S. PATENT DOCUMENTS

| 3,709,858 | 1/1973 | Albers et al. | 524/428 |
| 3,932,319 | 1/1976 | Clendinning et al. | 524/14 |
| 4,097,445 | 6/1978 | Martins et al. | 524/440 |
| 4,663,428 | 5/1987 | Okitu et al. | 528/292 |
| 5,028,649 | 7/1991 | Efner | 524/494 |
| 5,292,783 | 3/1994 | Buchanan et al. | 524/37 |
| 5,446,079 | 8/1995 | Buchanan et al. | 524/41 |
| 5,455,311 | 10/1995 | Grigat et al. | 525/439 |
| 5,464,689 | 11/1995 | Matsumura et al. | 524/439 |
| 5,559,171 | 9/1996 | Buchanan et al. | 524/41 |
| 5,580,911 | 12/1996 | Buchanan et al. | 524/41 |
| 5,599,858 | 2/1997 | Buchanan et al. | 524/41 |
| 5,644,020 | 7/1997 | Timmermann et al. | 525/450 |
| 5,663,216 | 9/1997 | Tomka | 524/13 |

FOREIGN PATENT DOCUMENTS

| 0 533 314 A2 | 3/1993 | European Pat. Off. . |
| 0561224 | 9/1993 | European Pat. Off. . |
| 0593975 | 4/1994 | European Pat. Off. . |
| 0 629 662 A1 | 12/1994 | European Pat. Off. . |
| 0629662 | 12/1994 | European Pat. Off. . |
| 4327024 | 2/1995 | European Pat. Off. . |
| WO 92/09654 | 6/1992 | WIPO . |
| WO 9209654 | 6/1992 | WIPO . |
| WO 95/04106 | 2/1995 | WIPO . |
| WO 9504106 | 2/1995 | WIPO . |
| WO 95/18169 | 7/1995 | WIPO . |

OTHER PUBLICATIONS

Database WPI Week 9227 Derwent Publications Ltd., London, GB AN 92–222620 & JP 04 146 953 A (Agency Of Ind. Sci., & Techn.; Chuo Chem. Ind. Co. Ltd.) May 20, 1992.

Database WPI Week 9510 Derwent Publications Ltd., London, GB; AN 95–070450 & JP 06 345 944 A (Hokuetsu Paper Mills; Unitika Ltd.) Dec. 20, 1994.

*Primary Examiner*—Peter A. Szekely
*Attorney, Agent, or Firm*—Connolly & Hutz

[57]   ABSTRACT

This invention relates to reinforced thermoplastic moulding compositions prepared from biodegradable polymers, for example aliphatic or polyester amides, aliphatic polyester urethanes, and to the use thereof for the production of mouldings and to the mouldings, wherein the reinforcing materials are selected from wood flour, fibres of natural origin, minerals of natural origin, cellulose and cellulose derivatives.

6 Claims, No Drawings

BIODEGRADABLE PLASTICS FILLED WITH REINFORCING MATERIALS

Biodegradable plastics are known (c.f. for example EP-A 561 224). It is also known to introduce fillers into thermoplastics (c.f. for example *Römpp-Chemielexikon,* 9th edition, Thieme Verlag, Germany, headword "Füllstoffe". Incorporating fillers into thermoplastics conventionally increases stiffness, measured by the tensile modulus of elasticity, by approximately a factor of 2. Wood flour cannot be used as a filler in many thermoplastics as it decomposes during processing at relatively high temperatures. Glass fibres, for example, are not biodegradable and do not number among those substances which are desired in compost once a biodegradable material has been composted. Cellulose or cellulose derivatives cannot be used as a filler in many thermoplastics as they decompose during processing at relatively high temperatures.

The present invention provides reinforced thermoplastic moulding compositions prepared from biodegradable polymers, to a process for the production of these reinforced moulding compositions and to the use of the thermoplastic moulding compositions reinforced according to the invention as biodegradable materials for the production of, for example, injection moulded articles. The mouldings are distinguished by an outstanding range of properties, such as for example, tensile modulus of elasticity, toughness and strength.

Biodegradable and compostable polymers which may be considered are aliphatic or partially aromatic polyesters, thermoplastic aliphatic or partially aromatic poly-ester urethanes, aliphatic-aromatic polyester carbonates, aliphatic polyester amides.

The following polymers are suitable:

Aliphatic or partially aromatic polyesters prepared from

A) linear difunctional alcohols, such as for example ethylene glycol, hexanediol or preferably butanediol and/or optionally cycloaliphatic difunctional alcohols, such as for example cyclohexanedimethanol, and/or optionally branched difinctional alcohols, e.g. neopentyl glycol and additionally optionally small quantities of more highly functional alcohols, such as for example 1,2,3-propanetriol or trimethylol propanol and from aliphatic difunctional acids, such as for example and preferred succinic acid or adipic acid and/or optionally aromatic difunctional acids, such as for example terephthalic acid or isophthalic acid or naphthalenedicarboxylic acid and additionally optionally small quantities of higher functional acids, such as for example trimellitic acid or B) from acid- and alcohol-functionalised units, for example hydroxybutyric acid or hydroxyvaleric acid or lactic acid, or the derivatives thereof, for example ε-caprolactone, or dilactide or a mixture or copolymer prepared from A and B wherein the aromatic acids constitute a proportion of no more than 50 wt. %, relative to all the acids.

The acids may also be used in the form of derivatives, such as for example acid chlorides or esters;

Aliphatic or partially aromatic polyester urethanes prepared from

C) an ester portion prepared from linear difunctional alcohols, such as for example ethylene glycol, butanediol, hexanediol, preferably butanediol, and/or optionally cycloaliphatic difunctional alcohols, such as for example cyclohexanedimethanol and/or optionally branched difunctional alcohols, e.g. neopentyl glycol and additionally optionally small quantifies of more highly functional alcohols, such as for example 1,2,3-propanetriol, and from aliphatic difinctional acids, such as for example succinic acid or adipic acid and/or aromatic difunctional acids, such as for example cyclohexanedicarboxylic acid and terephthalic acid and additionally optionally small quantities of more highly functional acids, such as for example trimellitic acid or D) from an ester portion prepared from acid- and alcohol-functionalised units, for example hydroxybutyric acid or hydroxyvaleric acid or lactic acid, or the derivatives thereof, for example α-caprolactone or dilactide, or a mixture or copolymer prepared from C) and D), and E) from the reaction product of C) and/or D) with aliphatic and/or cycloaliphatic difunctional and additionally optionally more highly functional isocyanates, for example tetramethylene diisocyanate, hexamethylene diisocyanate, isophorone diisocyanate, optionally additionally with linear and/or branched cycloaliphatic difunctional and/or more highly functional alcohols, for example ethylene glycol, butanediol, hexanediol, neopentyl glycol, cyclohexanedimethanol, wherein the ester portion C) and/or D) amounts to at least 75 wt. % and the proportion of urethane segments amounts to at most 25 wt. %, relative to the sum of C), D) and E);

Aliphatic-aromatic polyester carbonates prepared from

F) an ester portion prepared from linear difunctional alcohols, such as for example ethylene glycol, butanediol, hexanediol, preferably butanediol, and/or optionally cycloaliphatic difunctional alcohols, such as for example cyclohexanedimethanol and/or optionally branched difinctional alcohols, e.g. neopentyl glycol and additionally optionally small quantities of more highly functional alcohols, such as for example 1,2,3-propanetriol or trimethylol propane and from linear difunctional acids, such as for example succinic acid or adipic acid and/or optionally cycloaliphatic difunctional acids, such as for example cyclohexanedicarboxylic acid and/or optionally small amounts of branched difunctional acids and additionally optionally small quantities of more highly functional acids, such as for example trimellitic acid or G) from an ester portion prepared from acid- and alcohol-functionalised units, for example hydroxybutyric acid or hydroxyvaleric acid, or the derivatives thereof, for example ε-caprolactone, or a mixture or copolymer prepared from F) and G) and H) a carbonate portion which is produced from aromatic difunctional phenols, preferably bisphenol A, and carbonate donors, for example phosgene, wherein the ester portion F) and/or G) amounts to at least 70 wt. %, relative to the sum of F), G) and H);

Aliphatic polyester amides prepared from

I) an ester portion prepared from linear and/or cycloaliphatic and additionally optionally small amounts of branched difunctional alcohols such as for example ethylene glycol, butanediol, hexanediol, preferably butanediol, cyclohexanedimethanol and additionally optionally small quantities of more highly functional alcohols, for example 1,2,3-propanetriol or trimethylol propane, and from linear and/or cycloaliphatic and additionally optionally small amounts of branched difunctional acids, for example succinic acid, adipic acid, cyclohexanedicarboxylic acid, preferably adipic acid, and additionally optionally small quantities of more highly functional acid, for example trimellitic acid, or K) from an ester portion prepared from acid- and alcohol-functionalised units, for example hydroxybutyric acid or hydroxyvaleric acid or lactic acid, or the derivatives thereof, for example ε-caprolactone or dilactide, or a mixture or copolymer prepared from I) and K), and L) an amide portion prepared from linear and/or cycloaliphatic and additionally optionally small amounts of branched difunctional and additionally optionally small quantities of more highly functional amines, for example tetramethylenediamine, hexamethylenediamine, isophoronediamine, and from linear and/or cycloaliphatic and additionally optionally small amounts of branched difunctional and additionally optionally small quantities of more highly functional acids, for example succinic acid or adipic acid, or M) from an amide portion prepared from acid- and amine-functionalised units, preferably ω-laurolactam and particularly preferably ε-caprolactam, or a mixture prepared from L) and M) as the amide portion, wherein the ester portion I) and/or K) amounts to at least 30 wt. %, relative to the sum of I), K), L) and M).

The biodegradable copolyesters, polyester carbonates, polyester urethanes and polyester amides have a molecular weight of at least 10000 g/mol and have a random distribution of the starting substances (monomers) in the polymer.

Among the stated biodegradable polymers, polyester amides, polyester urethanes and polyester carbonates are preferred, with polyester amides being particularly preferred.

The property of compostability according to the invention is defined as follows:

The polymers to be tested are incubated at 37° C. in a liquid medium to ASTM G 22 (composition in table 1) with a mixture of microorganisms from garden compost with swirling (200 rpm) and in the presence of air. To this end, approximately 1 g of the polymer in pieces of several cm in size in 250 ml of nutrient salt solution in a 1 l conical flask are inoculated with 2 ml of a suspension of 10 g of garden compost in 100 ml of nutrient salt solution. Coarse particles have previously been screened out of the compost suspension with a fine sieve. The dry matter (DM) content of the inoculum is then approximately 50 mg. As a control in order to measure the abiotic weight loss of the polymer sample, a batch is combined with $HgCl_2$ (500 mg/l). Further control batches contain cellulose (4 g/l, grade DP 500, Wolff Walsrode) in order to monitor growth with a natural substrate or are prepared without adding a source of carbon in order to determine the background growth and decrease in DM of the inoculum.

TABLE 1

Composition of the nutrient salt solution to ASTM G 22

| | |
|---|---|
| $KH_2PO_4$ | 0.7 g |
| $K_2HPO_4$ | 0.7 g |
| $MgSO_4$ -$7H_2O$ | 0.7 g |
| $NH_4NO_3$ | 1.0 g |
| NaCl | 0.005 g |
| $FeSO_4$ -$7H_2O$ | 0.002 g |
| $ZnSO_4$ -$7H_2O$ | 0.002 g |
| $MnSO_4$ -$H_2O$ | 0.001 g |
| Distilled $H_2O$ | 1000.0 ml |

In order to determine the dry matter content of the non water soluble constituents (polymer or polymer residues, biomass and inoculum), the entire contents of the flask is centrifuged, washed once in a 0.05 M phosphate buffer and the insoluble residue dried at 80° C. for at least 48 hours. The biomass and the pure inoculum is determined in a parallel flask. The proportion of polymer residues may be determined by subtracting one of these measured values from the other.

Biomass is also measured by processing the entire contents of a flask. To this end, a modified version of the Lumac-3M adenosine triphosphate (ATP) determination method is used: 10 minutes after addition of the reactive reagent (Lumac), 2.5 ml of a 33% tetrabutylammonium hydroxide solution are added. This results in the complete release of ATP from the entire biomass within 30 seconds. After this time, the ATP content may be determined using the conventional luciferin/luciferase reaction in accordance with Lumac's instructions. In order to correlate ATP content with dry matter content, a 24 hour culture of *Kl. planticola* is also measured, the ATP/DM ratio of which has previously been determined.

For the purposes of the invention, any samples which allow a biomass growth on the polymer of at least 30 mg/l under the above-stated conditions within a maximum of two weeks are described as readily compostable.

For the purposes of the invention, samples which allow a biomass growth of at most 5 mg/l under the above-stated conditions within a maximum of two weeks are not compostable.

Reinforcing materials are selected from the following group: wood flour, fibres of natural origin (natural fibres), minerals of natural origin, cellulose and cellulose derivatives.

For the purposes of the invention, wood flour is mechanically comminuted wood having an edge length of at most 3 mm, preferably of at most 1 mm, particularly preferably of at most 0.5 mm. There are no technical restrictions with regard to the type of wood, but on toxicological grounds, wood flour is preferred which does not originate from oaks, beeches or tropical woods.

The thermoplastic moulding compositions generally contain 0.1 wt. % to 80 wt. %, preferably 25 wt. % to 65 wt. %, particularly preferably 32 wt. % to 44 wt. % of wood flour.

The present invention also provides a process for the production of the filled or reinforced thermoplastic moulding compositions according to the invention, characterised in that the wood flour is dried to a water content of at most 5 wt. %, preferably of at most 1 wt. %, and intimately mixed with the biodegradable polymer, for example in a kneader or preferably an extruder.

For the purposes of the present invention, fibres of natural origin (natural fibres) which are suitable as a reinforcing material are those having a minimum length of 1 mm with a length/diameter ratio of at least 10. Fibres of vegetable origin are preferred, particularly preferably the fibres of hemp, flax, ramie and sisal.

The fibres must be present in fibrous form (i.e. not clumped together as in plants) and any adhering contaminants must be removed. There is no requirement with regard to maximum length.

The thermoplastic moulding compositions generally contain 0.1 wt. % to 80 wt. %, preferably 11 wt. % to 65 wt. %, particularly preferably 17 wt. % to 35 wt. % of natural fibres.

The present invention also provides a process for the production of the reinforced thermoplastic moulding compositions according to the invention, characterised in that natural fibres are dried to a water content of at most 5 wt. %, preferably of at most 2 wt. %, and intimately mixed with the biodegradable polymer, for example in a kneader or preferably an extruder.

For the purposes of the present invention, suitable fillers are minerals of natural origin, which are used in pulverulent form, as is conventional for incorporation into non biodegradable thermoplastics.

Examples of preferred mineral fillers are gypsum, wollastonite, and particularly preferably chalk and kaolin.

The thermoplastic moulding compositions according to the invention contain 1 wt. % to 80 wt. %, preferably 10 wt. % to 65 wt. %, particularly preferably 20 wt. % to 40 wt. % of minerals of natural origin.

The present invention also provides a process for the production of the reinforced thermoplastic moulding compositions according to the invention, characterised in that the minerals of natural origin are intimately mixed with the biodegradable polymer, for example in a kneader or preferably an extruder.

Cellulose or cellulose derivatives are also suitable as fillers or reinforcing materials for the purposes of the invention.

For the purposes of the invention, cellulose is defined in accordance with *Römpp-Chemielexikon,* 9th edition, headword "Cellulose". Cellulose is commercially available, for example, as microcrystalline cellulose under the trade name Avicel®, from E. Merck.

For the purposes of the invention, cellulose should also be taken to mean paper flour and wood pulp (industrially processed cellulose). Paper flour is cellulose which has been processed into paper with appropriate additives. Suitable paper flour is preferably that having constituents with edge lengths of below 1 mm, particularly preferably of below 0.2 mm.

For the purposes of the invention, cellulose derivatives are cellulose ethers, such as methylcellulose, ethylcellulose, dihydroxypropylcellulose, hydroxybutylcellulose, methylhydroxyethylcellulose, methylhydroxypropylcellulose, methylhydroxybutylcellulose, ethylhydroxypropylcellulose, ethylhydroxyethylcellulose, carboxyalkylcellulose, sulphoalkylcellulose, cyanoethylcellulose, the production of which is described, for example, in *Encyclopedia of polymer science and engineering,* Wiley, N.Y. 1985, volume 3, pages 242 et seq. Suitable epoxides are preferably monoepoxides, such as ethylene oxide, propylene oxide, 1,2-epoxybutane, 1,2-epoxyhexane, 1,2-epoxyoctane, 1,2-epoxydecane, 1,2-epoxydodecane, 1,2-epoxyhexadecane, 1,2-epoxyoctadecane, stearic acid glycidyl ether, epoxybutyl stearate, lauryl glycidyl ether, glycidyl methyl ether, glycidyl ethyl ether, glycidyl propyl ether, glycidyl butyl ether, glycidyl tert.-butyl ether, glycidyl acrylate, glycidyl methacrylate, allyl glycidyl ether, butadiene monoxide, glycidol, 3-glycidoxypropyltrimethoxysilane, 3-glycidoxypropyltriethoxysilane, di-N-butyl-amino-2,3-epoxypropane, diethyl-2,3-epoxypropyl phosphate, 4-(2,3-epoxypropyl)-morpholine and styrene oxide.

Among the cellulose derivatives, cellulose ethers, such as for example hydroxyethylcellulose or hydroxypropylcellulose, are particularly preferred.

The thermoplastic moulding compositions generally contain 0.1 wt. % to 80 wt. %, preferably 20 wt. % to 65 wt. %, particularly preferably 26 wt. % to 44 wt. %, of cellulose or cellulose derivatives.

The present invention also provides a process for the production of the filled or reinforced thermoplastic moulding compositions according to the invention, characterised in that the cellulose or cellulose derivatives are intimately mixed with the biodegradable polymer, for example in a kneader or preferably an extruder.

The present invention moreover provides the use of reinforcing materials, selected from the group comprising wood flour, fibres of natural origin, minerals of natural origin, cellulose and cellulose derivatives for reinforcing biodegradable plastics.

The moulding compositions according to the invention may be modified with processing auxiliaries, such as for example nucleation auxiliaries, mould release agents or stabilisers, wherein care must be taken to ensure that complete compostability is not impaired or that the residual substances in the compost, for example, mineral auxiliaries, are harmless.

The present invention also provides the mouldings, moulded parts, extrudates or foams produced from the thermoplastic moulding compositions according to the invention, which may be used, for example, as flower pots, plant pots, plant ties, wreath stiffeners, grave-light surrounds, films, profiles, coffins or coffin parts.

EXAMPLES

The polyester amide used in the Examples prepared from a proportion of 60 wt. % of polycaprolactam and a proportion of 40 wt. % of an ester prepared from adipic acid and butanediol has a relative solution viscosity of 2.5, measured on a 1% solution in meta-cresol at 20° C.

Example 1A 60 wt. % of biodegradable polyester amide prepared from a proportion of 60 wt. % of polycaprolactam and a proportion of 40 wt. % of an ester prepared from adipic acid and butanediol are compounded at a rate of 10 kg/h with 40 wt. % of wood flour in a Brabender DSE 32 twin screw extruder at a speed of 150 rpm and a melt temperature of 209° C. and then injection moulded to produce test specimens.

Testing reveals a tensile modulus of elasticity of 1505±16 N/mm$^2$, measured to DIN 53 457, and an impact strength of 28.2±1.5 kJ/m$^2$, measured to ISO 180-1C.

Example 1B 65 wt. % of biodegradable polyester amide according to Example 1A are compounded with 35 wt. % of wood flour on a twin screw extruder ZSK 32/14 at a rate of 10 kg/h at a speed of 150 rpm and a melt temperature of 178° C. and injection moulded to produce test specimens.

Testing reveals a tensile modulus of elasticity of 1410±2 N/mm$^2$, measured to DIN 53 457, and an impact strength of 40.6±10.2 kJ/m$^2$, measured to ISO 180-1C.

Example 2

70 wt. % of biodegradable polyester amide prepared from a proportion of 60 wt. % of polycaprolactam and a proportion of 40 wt. % of an ester prepared from adipic acid and butanediol (relative solution viscosity: 2.5, measured on a 1% solution in meta-cresol at 20° C.) are compounded with 30 wt. % of hemp fibres on a ZSK 32/14 twin screw extruder at a rate of 5,5 kg/h and a melt temperature of 176° C. and then injection moulded to produce test specimens.

Testing reveals a tensile modulus of elasticity of 1112±19 N/mm$^2$, measured to DIN 53 457, and an impact strength of 52.2±5.2 kJ/m$^2$, measured to ISO 180-1C.

Example 3A (According to the Invention)

60 wt. % of biodegradable polyester amide prepared from a proportion of 60 wt. % of polycaprolactam and a proportion of 40 wt. % of an ester prepared from adipic acid and butanediol are compounded with 40 wt. % of kaolin in a ZSK 32/14 twin screw extruder at a rate of 10 kg/h and a melt temperature of 168° C. and then injection moulded to produce test specimens.

Testing reveals a tensile modulus of elasticity of 599±70 N/mm$^2$, measured to DIN 53 457, and an impact strength of "unbroken", measured to ISO 180-1C.

Example 3B 50 wt. % of biodegradable polyester amide prepared from a proportion of 60 wt. % of polycaprolactam and a proportion of 40 wt. % of an ester prepared from adipic acid and butanediol are compounded with 50 wt. % of kaolin in a ZSK 32/14 twin screw extruder at a rate of 10 kg/h and a melt temperature of 170° C. and then injection moulded to produce test specimens.

Testing reveals a tensile modulus of elasticity of 716±74 N/mm$^2$, measured to DIN 53 457, and an impact strength of "unbroken", measured to ISO 180-1C.

Example 4A

Biodegradable polyester amide prepared from a proportion of 60 wt. % of polycaprolactam and a proportion of 40 wt. % of an ester prepared from adipic acid and butanediol is compounded at a rate of 10 kg/h with 40 wt. % of microcrystalline cellulose (Avicel®, E. Merck) in a ZSK 32/14 twin screw extruder at a speed of 150 rpm and a melt temperature of 174° C. and then injection moulded to produce test specimens.

Testing reveals a tensile modulus of elasticity of 1030 N/mm$^2$, measured to DIN 53 457, and an impact strength of 33.0 kJ/m$^2$ measured to ISO 180-1C.

Example 4B

Biodegradable polyester amide prepared from a proportion of 60 wt. % of polycaprolactam and a proportion of 40 wt. % of an ester prepared from adipic acid and butanediol is compounded at a rate of 10 kg/h with 50 wt. % of microcrystalline cellulose (Avicel®, E. Merck) in a ZSK 32/14 twin screw extruder at a speed of 150 rpm and a melt temperature of 177° C. and then injection moulded to produce test specimens.

Testing reveals a tensile modulus of elasticity of 1689 N/mm$^2$, measured to DIN 53 457, and an impact strength of 22.0 kJ/m$^2$, measured to ISO 180-1C.

Example 5

Biodegradable polyester amide prepared from a proportion of 60 wt. % of polycaprolactam and a proportion of 40 wt. % of an ester prepared from adipic acid and butanediol is compounded with 40 wt. % of hydroxypropylcellulose and then injection moulded to produce test specimens.

Testing reveals a tensile modulus of elasticity of 1420 N/mm$^2$, measured to DIN 53 457.

Comparison 6

Test specimens made from pure polyester amide prepared from a proportion of 60 wt. % of polycaprolactam and a proportion of 40 wt. % of an ester prepared from adipic acid and butanediol (relative solution viscosity: 2.5, measured on a 1% solution in meta-cresol at 20° C.) have a tensile modulus of elasticity of 200 N/mm$^2$ (measured to DIN 53 457) and an impact strength of "unbroken" (measured to ISO 180-1C).

We claim:

1. Reinforced thermoplastic moulding compositions containing aliphatic polyester amides, and wherein said polyester amides have a random distribution of starting substances in the polymer and have a molecular weight of at least 10000 g/mol, and reinforcing materials selected from the group consisting of wood flour, gypsum, wollastonite, chalk, kaolin, and cellulose.

2. Moulding compositions according to claim 1, wherein said aliphatic polyester amides are prepared from I) an ester portion prepared from linear and/or cycloaliphatic and additionally optionally amounts of branched difunctional alcohols and from linear and/or cycloaliphatic and additionally optionally amounts of branched difunctional acid or K) from an ester portion prepared from acid- and alcohol-functionalised units, or a mixture or copolymer prepared from I) and K), and L) an amide portion prepared from linear and/or cycloaliphatic and additionally optionally amounts of branched difunctional and additionally optionally quantities of functional amines and from linear and/or cycloaliphatic and additionally optionally amounts of branched difunctional or M) from an amide portion prepared from acid- and amine-functionalised units or a mixture prepared from L) and M) as the amide portion, wherein the ester portion I) and/or K) amounts to at least 30 wt. %, relative to the sum of I), K), L) and M).

3. Moulding compositions according to claim 1, wherein the polymers used are aliphatic polyester amides prepared from I) an ester portion prepared from linear and/or cycloaliphatic and additionally optionally amounts of branched difunctional alcohols and from linear and/or cycloaliphatic and additionally optionally amounts of branched difunctional acids, or K) from an ester portion prepared from acid- and alcohol-functionalised units, or a mixture or copolymer prepared from I) and K), and L) an amide portion prepared from linear and/or cycloaliphatic and additionally optionally amounts of branched difunctional and additionally optionally quantities of functional amines, and from linear and/or cycloaliphatic and additionally optionally amounts of branched difunctional, or M) from an amide portion prepared from acid- and amine-functionalised units, or a mixture prepared from L) and M) as the amide portion, wherein the ester portion I) and/or K) amounts to at least 30 wt. %, relative to the sum of I), K), L) and M).

4. Moulding compositions according to claim 1, wherein the quantity of reinforced materials is 0.1 to 80 wt. %.

5. Moulding compositions according to claim 4, wherein the quantity of reinforcing materials is 10 to 65 wt. %.

6. Mouldings, moulded parts or extrudates produced from moulding compositions according to claim 1.

* * * * *